Jan. 13, 1959 W. J. FEDORCHAK ET AL 2,868,061
INSPECTION OF GLASSWARE BY RADIATION
Filed Oct. 26, 1954 5 Sheets-Sheet 1

INVENTORS,
WILLIAM J. FEDORCHAK,
RICHARD L. EARLY,
JAMES W. JOHNESEE
BY
ATTORNEYS

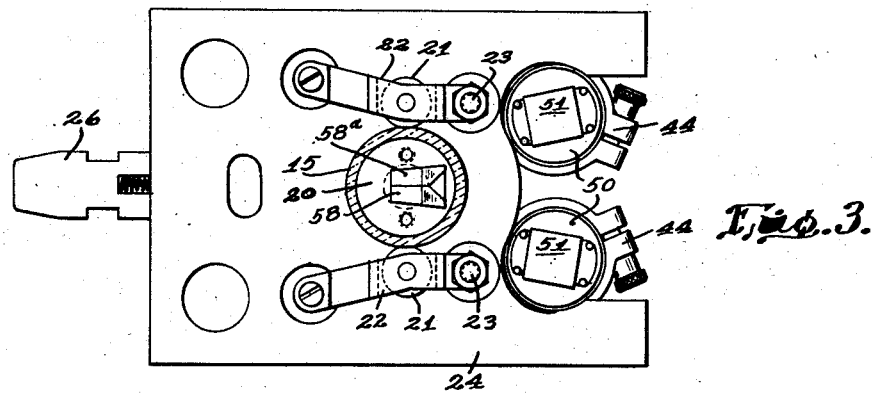
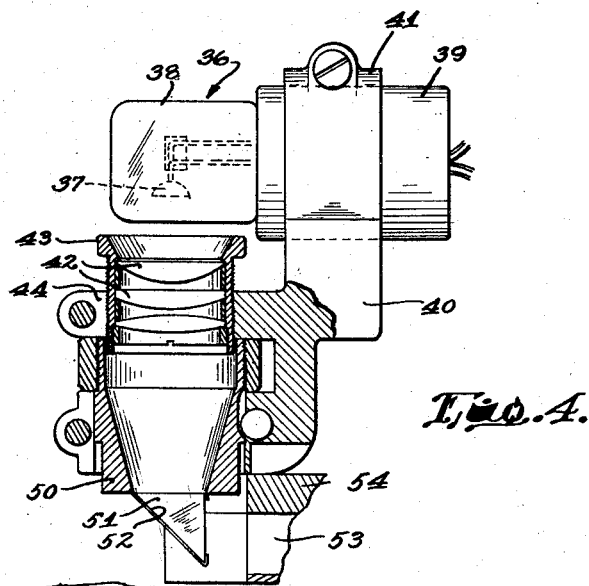
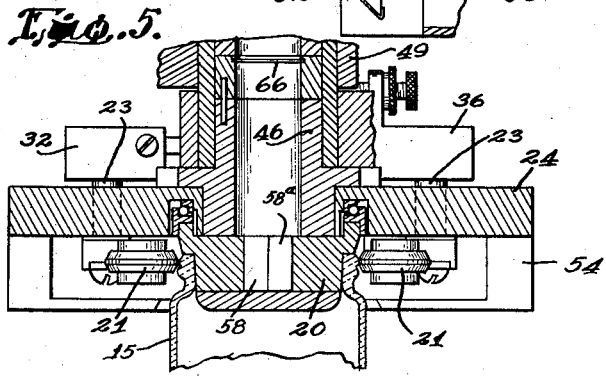

Jan. 13, 1959
W. J. FEDORCHAK ET AL
2,868,061
INSPECTION OF GLASSWARE BY RADIATION
Filed Oct. 26, 1954
5 Sheets-Sheet 3
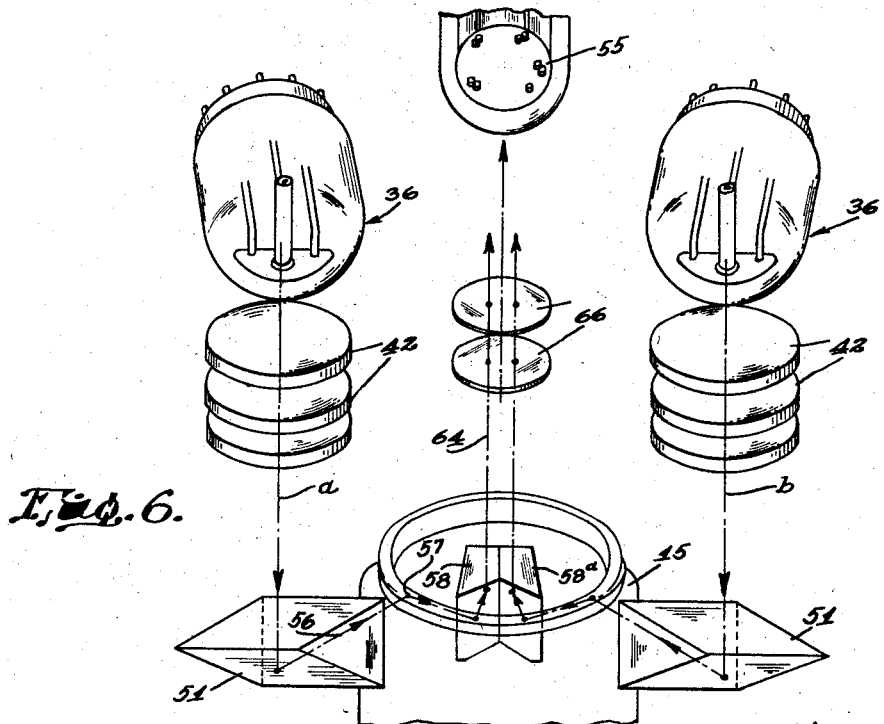
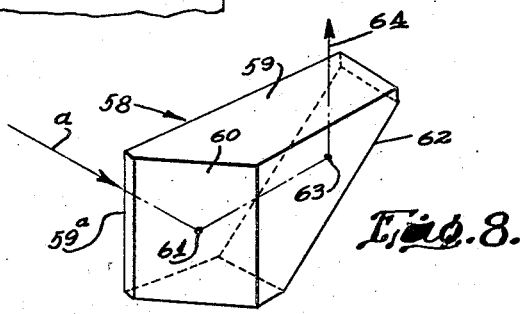
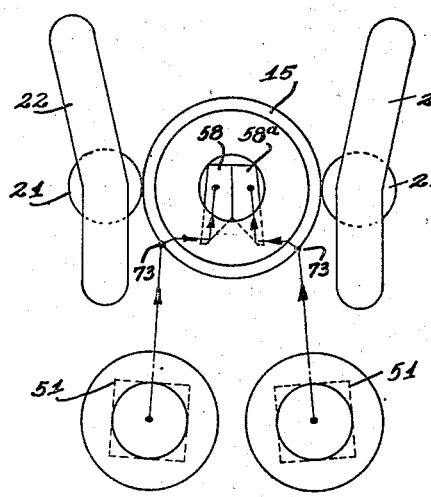
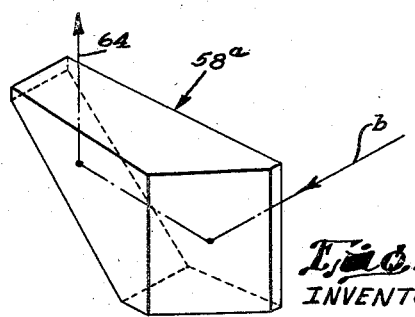
INVENTORS,
WILLIAM J. FEDORCHAK,
RICHARD L. EARLY,
JAMES W. JOHNESEE
BY
ATTORNEYS Jan. 13, 1959 W. J. FEDORCHAK ET AL 2,868,061
INSPECTION OF GLASSWARE BY RADIATION
Filed Oct. 26, 1954 5 Sheets-Sheet 4
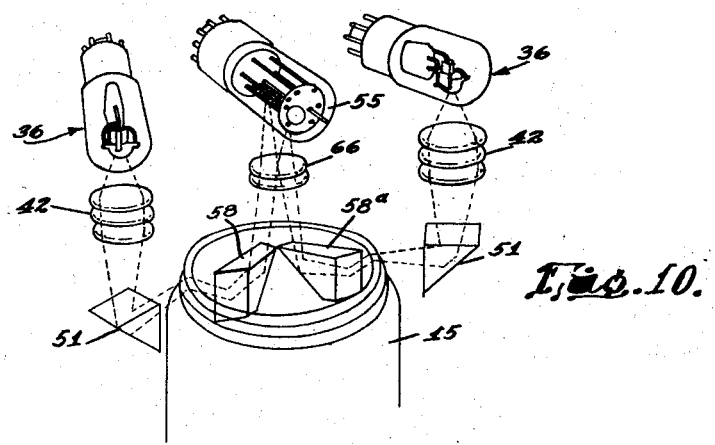
Fig. 10.
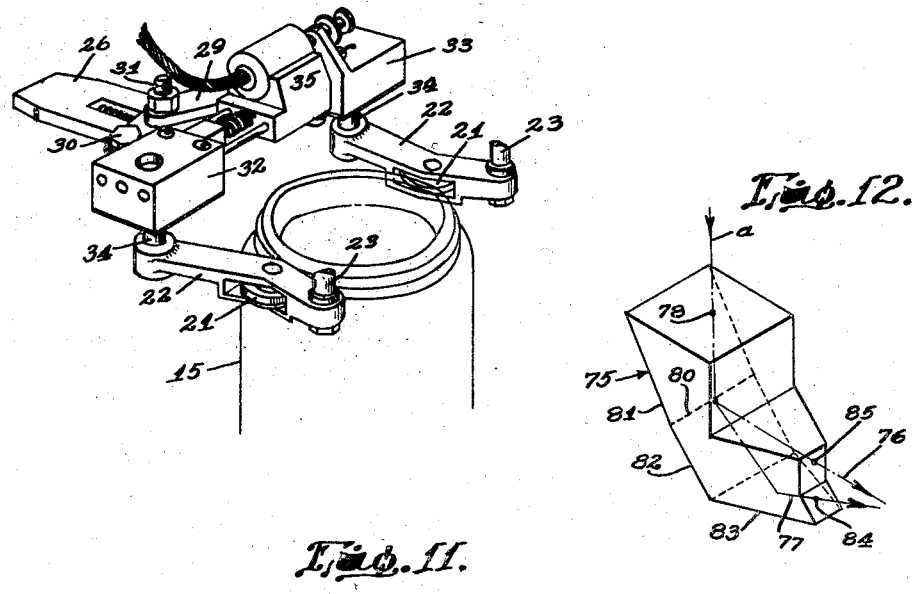
Fig. 11.
Fig. 12.
INVENTORS,
WILLIAM J. FEDORCHAK,
RICHARD L. EARLY,
JAMES W. JOHNESEE
BY
ATTORNEYS Jan. 13, 1959   W. J. FEDORCHAK ET AL   2,868,061
INSPECTION OF GLASSWARE BY RADIATION
Filed Oct. 26, 1954   5 Sheets-Sheet 5

INVENTORS,
WILLIAM J. FEDORCHAK,
RICHARD L. EARLY,
JAMES W. JOHNESEE
BY
ATTORNEYS

United States Patent Office 2,868,061
Patented Jan. 13, 1959

2,868,061

INSPECTION OF GLASSWARE BY RADIATION

William J. Fedorchak, Granite City, Ill., and Richard L. Early, Toledo, and James W. Johnesee, Maumee, Ohio, assignors to Owens-Illinois Glass Company, a corporation of Ohio Application October 26, 1954, Serial No. 464,683

9 Claims. (Cl. 88—14)

Our invention relates to apparatus for inspecting glassware for detecting cracks, crizzles or other surface defects. The invention relates to the type of apparatus in which such surface defects are detected by means of a beam of light or radiation scanning the surface under test. A photoelectric or photo-multiplier cell in the path of radiation reflected from said surface is energized by any sudden change in the reflected radiation caused by a defect brought into the path of the inspection beam.

The invention in its preferred form is used for inspecting hollow glassware such as bottles, jars, or other containers and particularly for inspecting the sealing surfaces or rim portions of the articles to discover any defect which would prevent perfect sealing of the container. Cracks or crizzles in the sealing surface of such articles usually extend in a radial direction and prior art inspection devices have been designed and adapted for detecting such defects by directing the inspection beam against the surface under inspection at a particular angle, the photocell for receiving the reflected radiation being positioned in the path of the reflected beam. However cracks and other surface defects frequently extend in other directions so that the usual detecting means is ineffective for discovering such defects.

An object of the present invention is to provide an apparatus which overcomes such difficulty and which is effective for discovery of such defects and for giving suitable signals for indicating the defective ware. The present invention provides a system in which dual light sources are employed, preferably concentrated-arc lamps being used as the light sources. Radiation from both lamps is directed against the surface under test. The reflected radiation is directed through a channel common to both reflected beams and applied to a photo-multiplier cell. Polarizing plates or filters in the path of the reflected radiation are adjustable to regulate the normal light level to correspond to the sensitivity of the photo-multiplier pick up cell. This system, employing a dual light source for detecting cracks or crizzles, is found to be far superior to systems in which a single light source or head is employed and particularly in respect to the setting up, adjusting, and detecting. This superiority is found in the provision of a much higher degree of light concentration on the surface under inspection, such as the sealing surface of a bottle or jar finish, thereby enabling detection of a comparatively great variety of defects such as crizzles, checks, etc. Further, the invention provides means by which the normal light level can be controlled to operate the photo-multiplier tube within the range of its greatest sensitivity level. Moreover the use of the photo-multiplier pick up as a means of detecting such defects is found to be greatly superior to the use of a photo tube such as employed in prior art devices. The photo-multiplier tube amplification factor is far greater than with such photo tubes and also has much greater stability.

Other objects of the invention and the nature thereof will appear more fully hereinafter.

Referring to the accompanying drawings,

Fig. 1 is a plan view of an apparatus embodying a preferred form of our invention.

Fig. 2 is a sectional elevation, the section being taken at the line 2—2 on Fig. 1.

Fig. 3 is a bottom plan view of the apparatus.

Fig. 4 is a section at the line 4—4 on Fig. 1, showing particularly an arc lamp, condensing lenses and a reflecting prism.

Fig. 5 is a section at the line 5—5 on Fig. 1, showing a glass jar in position for inspection and gauging.

Fig. 6 is a schematic diagram showing the light sources and the paths of the light beams.

Fig. 7 is a diagrammatic view of a modification, showing the paths of the radiation beams.

Figs. 8 and 9 are respectively right half and left half views of Abbe prisms.

Fig. 10 is a diagrammatic illustration of crizzle detecting apparatus comprised in one form of our invention.

Fig. 11 is a partly diagrammatic perspective view of the gauging apparatus.

Fig. 12 is an isometric view of a prism by which the incident radiation is split into two beams at an angle to each other.

Figure 13:
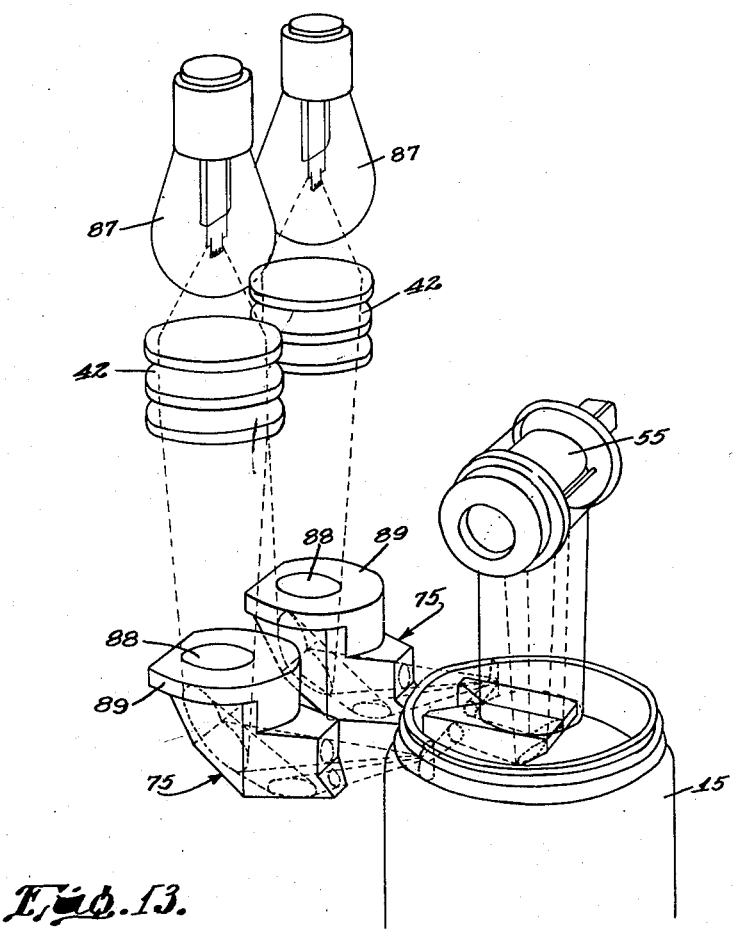
Fig. 13 is a schematic view of a crizzle detecting apparatus in which each of the radiation beams from the two separate sources is split by means of a prism such as shown in Fig. 12.

Referring particularly to Figs. 1–5, the apparatus shown is adapted for gauging and inspecting hollow glass containers such as jars 15, particularly for gauging the diameter of the jar neck or finish and also for inspecting the rim surface or finish of the jar for detecting surface defects. During inspection the jar is supported on a pad 16 (Fig. 2) which is journalled in a carrier frame 17 and rotates about a vertical axis. The means for rotating the pad includes a train of gearing 18. The pad 16 and the frame 17 are movable vertically for lifting the jar into position for testing. The means for lifting, lowering, and rotating the pad 16 with the jar thereon may be the same as disclosed, for example, in Patent 2,327,629 for Gauging Machine, granted August 24, 1943. As the jar is lifted to the testing position a centering cone 20 enters the mouth of the jar and holds it against lateral displacement. The jar is rotated about its axis during the inspection and gauging operation.

The external diameter of the jar neck or finish is gauged by means of a pair of gauging rolls 21 mounted on a pair of gauging arms 22. These arms are positioned on the lower side of a supporting plate 24, the arms being connected to pivots 23 which extend upwardly through openings in the plate 24. The rolls 21 are yieldingly held in engagement with the workpiece during the test while the workpiece is rotated. The means for spreading the gauging arms 22 and releasing the workpiece comprises a slide bar 26 mounted for lengthwise sliding movement on the plate 24. The bar 26 is moved in a forward direction for spreading the gauging arms by means of a rock arm 27 (Fig. 1) on a vertical rock shaft 28 which is periodically rocked in a conventional manner. The means for rocking the shaft 28 may be the same as disclosed in the aforementioned patent. Operating connections between the slide bar 26 and gauging arms comprise a pair of bell crank levers 29 which rock about the pivots 30. The bell cranks are connected to the slide bar by a pivot pin 31. The forward ends of the bell cranks 29 extend between slidable members 32 and 33 (Fig. 11), said members being connected by pins 34 to the free ends of the gauging arms 22.

A differential transformer 35 has its winding and armature or core mounted respectively in the members 33 and 32. The transformer elements are moved toward and from each other in response to variations of the diameter of the surface under test. Such relative movement of the transformer elements produces an electrical signal. This signal may be amplified and used for indicating workpieces which are out of round or the diameter of which is outside of permissible limits. The signal from the transformer may be used for effecting the operation of a signal or other desired mechanism. The differential transformer and means actuated thereby form no part of the present invention.

The means for inspecting the containers 15 for surface defects such as cracks and crizzles, comprises separate light sources 36. These consist of concentrated-arc lamps. The electrodes 37 (Fig. 4) are mounted in a glass envelope 38 carried by an insulating sleeve or case 39. Each lamp is mounted in a bracket 40 having a split sleeve 41 in which the lamp is clamped. The radiation of the lamp may consist largely of blue, violet and ultra-violet rays. The beam of radiation is directed downwardly through condensing lenses 42 mounted in a shell 43. The bracket 40 is formed with a split collar 44 by which the shell 43 is clamped in the bracket. The brackets 40 with the lamps and condensing lenses carried thereby, are mounted on a tubular support comprising an inner tubular member 46 mounted in the base plate 24 and a sleeve 47 surrounding the tube 46. The brackets 40 are formed with arms 48 and integral bearing collars 49 surrounding the sleeve 47.

Reflecting prisms 51 are mounted or carried, each in a tubular holder 50 mounted in the bracket 40. Each prism is formed with a reflecting surface 52 which may be inclined at 45° and which reflects the light beam horizontally, directing it against the rim or sealing surface of the container. The horizontal beam reflected from the surface 52 is directed through a channel 53 formed in a plate 54 attached to the under surface of the base plate 24. The centering cone 20 has mounted therein reflecting prisms by which the radiation is reflected upwardly to a photo-multiplier cell 55 (Fig. 6) mounted above and in vertical alignment with the jar 15.

The paths of the light beams a and b are indicated in Fig. 6 by the broken lines and arrowheads. As here shown, the beam a, propagated from the lamp 36, is reflected by the prism 51 in a horizontal direction 56 to a point 57 on the rim or finish of the jar 15. The radiation deflected at the point 57 after passing through the glass wall of the jar is directed against the left half or section 58 of a composite prism by which it is reflected and directed vertically upward to the cell 55. The prism as here shown is an Abbe prism comprising separate right and left halves or sections 58ª and 58 respectively as shown isometrically in Figs. 8 and 9. The prism section 58 as shown in Fig. 8 is formed with a horzontal upper face 59, a vertical face 59ª, a vertical face 60 and an inclined face 62. The ray a enters the prism through the face 59ª and strikes the face 60 at the point 61. The radiation reflected from the surface 60 strikes the inclined face 62 of the prism at the point 63 and is reflected therefrom, the reflected ray being in the vertical line 64.

The radiation units, each comprising an arc lamp 36 (Fig. 6), condensing lenses and reflection prisms are symmetrically arranged on opposite sides of the axis of rotation of container 15. The beams directed horizontally against the rim of the container may be radial thereto and preferably substantially at right angles to each other. In other words they are convergent at an angle of about 90°.

Filters 66 are mounted in the path of the vertical radiation between the reflecting prisms and the photo-multiplier cell 55. These filters are in the form of horizontal disks or polarizing plates such as those sold under the trademark "Polaroid" and are adjustable by relative rotation to regulate the normal light level to operate the photo-multiplier tube 55 within the range of its greatest sensitivity level. As shown in Fig. 2 the polarizing disks 66 are mounted in sections of the tubular member 46. The section carrying the upper disk is rotatable for adjusting the disk and is held in adjusted position by a clamping screw 66ª.

Figure 14:
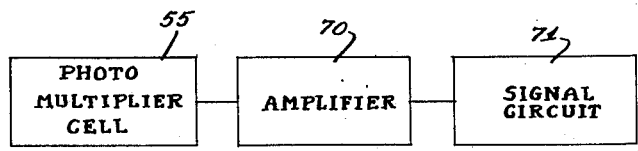
Fig. 14 is a block diagram indicating the manner in which the signal from the photo-multiplier cell is employed.

In operation, the jar 15 is placed on the pad 16 while the latter is in its lowered position. The pad is then raised, bringing the jar to position for testing with the centering cone 20 protruding into the jar. While in this position the jar is rotated so that the radiation beams scan the surface against which they are directed. Rotation is through a sufficient angle to cause both of the beams to scan the entire circumference of the surface under test. Any crack, crizzle or other surface defect when brought within the range of either of the radiation beams causes a sudden change in the value or intensity of the beam radiation striking the cell 55. This causes the cell to give a signal. Such signal is transmitted to an amplifier 70 (Fig. 14). The amplified signal is transmitted to the signal circuit 71 and may be used to actuate a thyratron, a relay circuit for an ejector mechanism, an electric signal light, a memory device controlling the operation of the ejector, or other desired signal.

In Fig. 10 the reflecting prisms 51 and the prism sections 58, 58ª are so arranged that the radiation beams strike the rim of the jar at substantially diametrically opposite points. In this arrangement the two sections of the Abbe prism are spread apart as indicated.

Fig. 7 diagrammatically illustrates an arrangement in which radiation beams from the two light sources are directed against the container 15 in approximately parallel paths. The beams strike the rim of the container at points 73 which may be 90° apart, more or less, circumferentially of the container. The radiation strikes the outer surface of the container and deflected as it enters the glass and again as it emerges at the inner surface of the container so that said beams are directed toward each other, strike the reflecting prisms and are directed upwardly therefrom.

A modified form of reflecting prism 75 as shown in Fig 12 is constructed and adapted to split the incident radiation into two separate beams 76 and 77 which emerge from the prism and are propagated in directions at an acute angle to each other. The beam enters the prism at the point 78 and is bisected at the meeting line 80 of two reflecting surfaces 81 and 82. The radiation reflected from these surfaces is divergent, one portion or beam 77 being directed against a surface 83 by which it is deflected and emerges from the prism at the point 84. The other beam 76 emerges at the point 85.

Fig. 13 illustrates schematically an arrangement in which prisms 75 are mounted respectively in the paths of the two radiation beams. The radiation sources are shown as lamps 87. The light beams are directed through the condensing lenses 42 and through openings 88 in frames 89 in which the prisms 75 are mounted. The beams are reflected and split as above described so that the two beams from each prism are directed against the rim of a jar under test. The two beams from each prism 75 are convergent substantially or approximately to a point on the surface under test. It will be seen that in this arrangement the inspecting beams strike the rim of the jar concurrently from four different directions. The beams after passing through the rim of the jar are again reflected and directed upwardly in the manner heretofore described against the photo-multiplier cell 55.

The term "light beam" as herein used is intended to cover any beam of radiation to which the photo-multiplier cell is responsive, including radiation not within the visible range.

Modifications may be resorted to within the spirit and scope of our invention.

I claim:

1. Apparatus for detecting surface defects in the surface of a hollow glass article, said apparatus comprising means for rotating the article about a vertical axis, a plurality of separate light sources, means for concurrently directing light beams from said sources against the exterior surface of said article while the latter is rotating and thereby causing said beams to scan a circumferential surface of the article, whereby radiation is transmitted through the wall of the article, means within the rotating article for reflecting the transmitted radiation upwardly, and a photo-multiplier cell positioned in the path of said radiation, whereby a defect in the surface being scanned will cause a change in the intensity of the radiation reaching said cell and cause the latter to give a signal.

2. The apparatus defined in claim 1, the said light sources consisting of concentrated-arc lamps.

3. The apparatus defined in claim 1, including polarizing plates in the path of the transmitted radiation, said plates being relatively adjustable to adjust the transmitted radiation to the level at which the said cell is most efficient.

4. Apparatus for inspecting a rim surface of a hollow glass container, said apparatus comprising means for rotating the container horizontally about its vertical axis, arc lamps, means for directing light beams from the lamps and projecting them in a substantially horizontal direction against the exterior surface of said rim whereby radiation is transmitted through the glass to the interior of the container, reflecting prisms mounted within the container and operative to direct the transmitted radiation upwardly in a path substantially coincident with said axis of rotation, and a photo-multiplier cell in the path of said upwardly directed radiation.

5. The apparatus defined in claim 4, the horizontally projected beams each forming an angle of about 45° with a line tangent to said rim surface at the point of incidence of the beam at said surface.

6. The apparatus defined in claim 4, said apparatus including polarizing plates mounted in the path of the upwardly directed radiation and relatively adjustable to vary the intensity of the radiation transmitted through the filters.

7. The combination of a support for supporting an open-mouth hollow glass container in upright position, means for rotating the support with the container about the vertical axis of the container, light generating devices, means for condensing light from said devices respectively and thereby forming and directing light beams in separate paths, means in the paths of said beams for reflecting each light beam and splitting it into separate beams, means for directing the separate beams against the surface of the said container at separated points while the container is rotating, means for directing the beams from said surface into a common channel, and a photoelectric cell in the path of the radiation in said channel.

8. The combination set forth in claim 7, the means for reflecting and splitting the light beams comprising prisms against which the light beams are directed, each prism having reflecting surfaces arranged at an angle to each other and meeting in a line in the path of the radiation beam directed thereagainst and thereby effecting said splitting of the beam.

9. Apparatus for detecting surface defects in the surface of a hollow article of transparent material, said apparatus comprising means for rotating the article about an axis, a plurality of separate sources of light radiation, means for concurrently directing beams of radiation from said sources against the exterior surface of said article while the latter is rotating and thereby causing said beams to scan a circumferential surface of the article, whereby radiation is transmitted through the wall of the article, means within the rotating article for reflecting the transmitted radiation outwardly from the article in the direction of said axis, and a cell sensitive to said radiation positioned in the path of said radiation, whereby a defect in the surface being scanned will cause a change in the intensity of the radiation reaching said cell and cause the latter to give a signal.

References Cited in the file of this patent

UNITED STATES PATENTS

| | | |
|---|---|---|
| 2,219,572 | Everett | Oct. 29, 1940 |
| 2,472,945 | Gingrich | June 14, 1949 |
| 2,481,863 | Owens | Sept. 13, 1949 |